Feb. 3, 1942.   R. T. KILLMAN ET AL   2,271,557
AUTOMATIC NOZZLE
Filed April 12, 1939   3 Sheets-Sheet 1
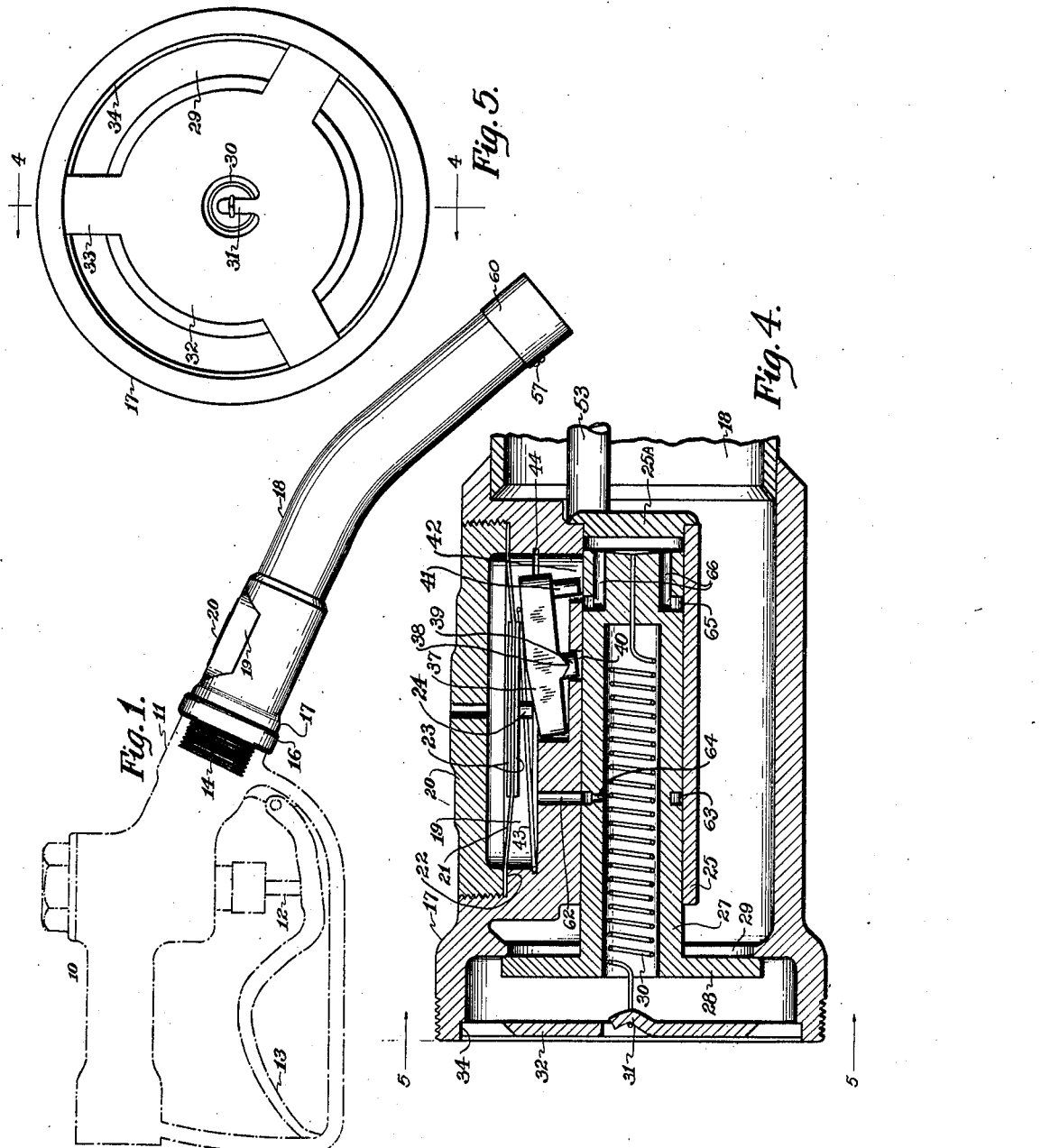
ROBERT T. KILLMAN
THOMAS A. KILLMAN
INVENTORS.
BY Robert T. Killman
ATTORNEY.

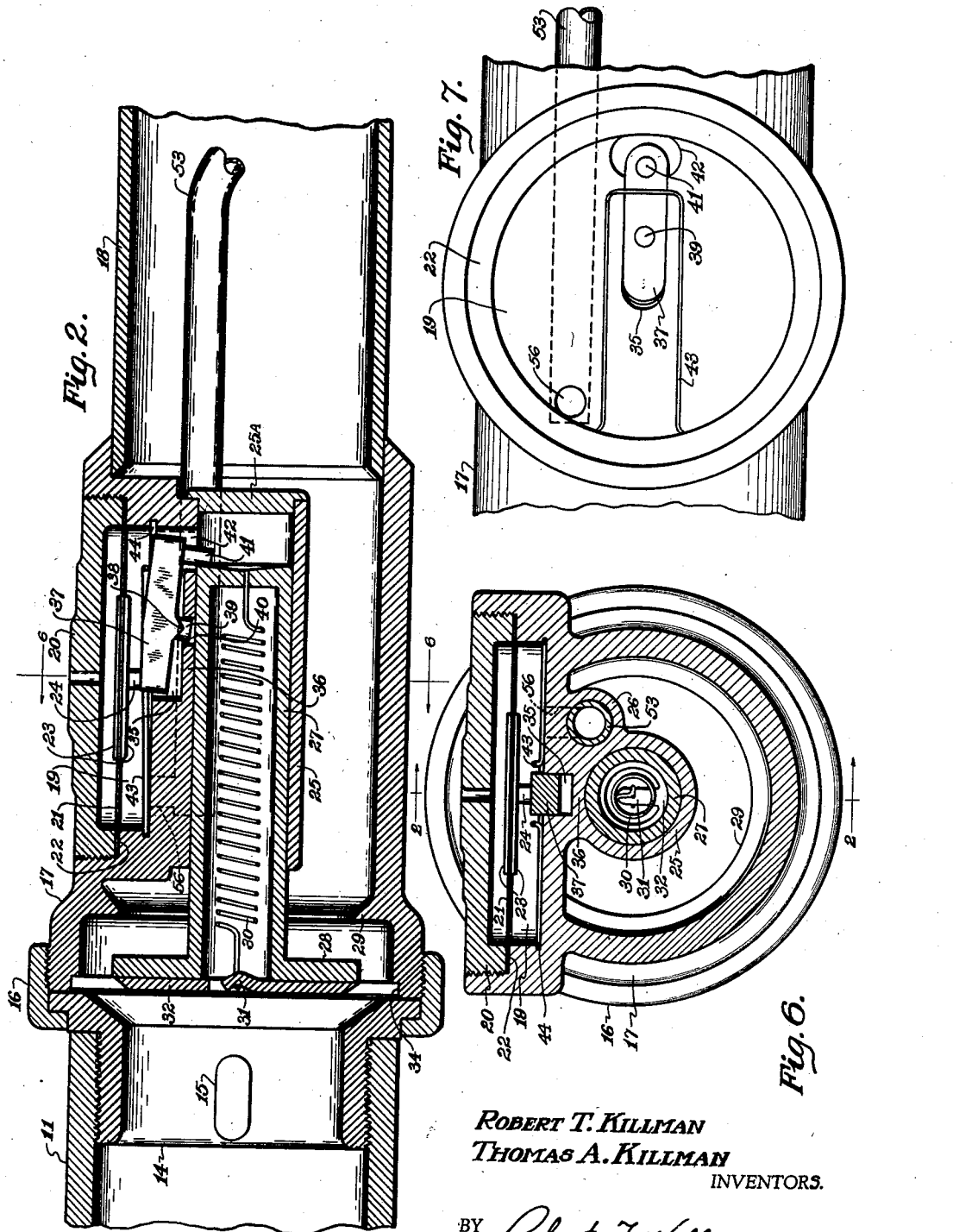

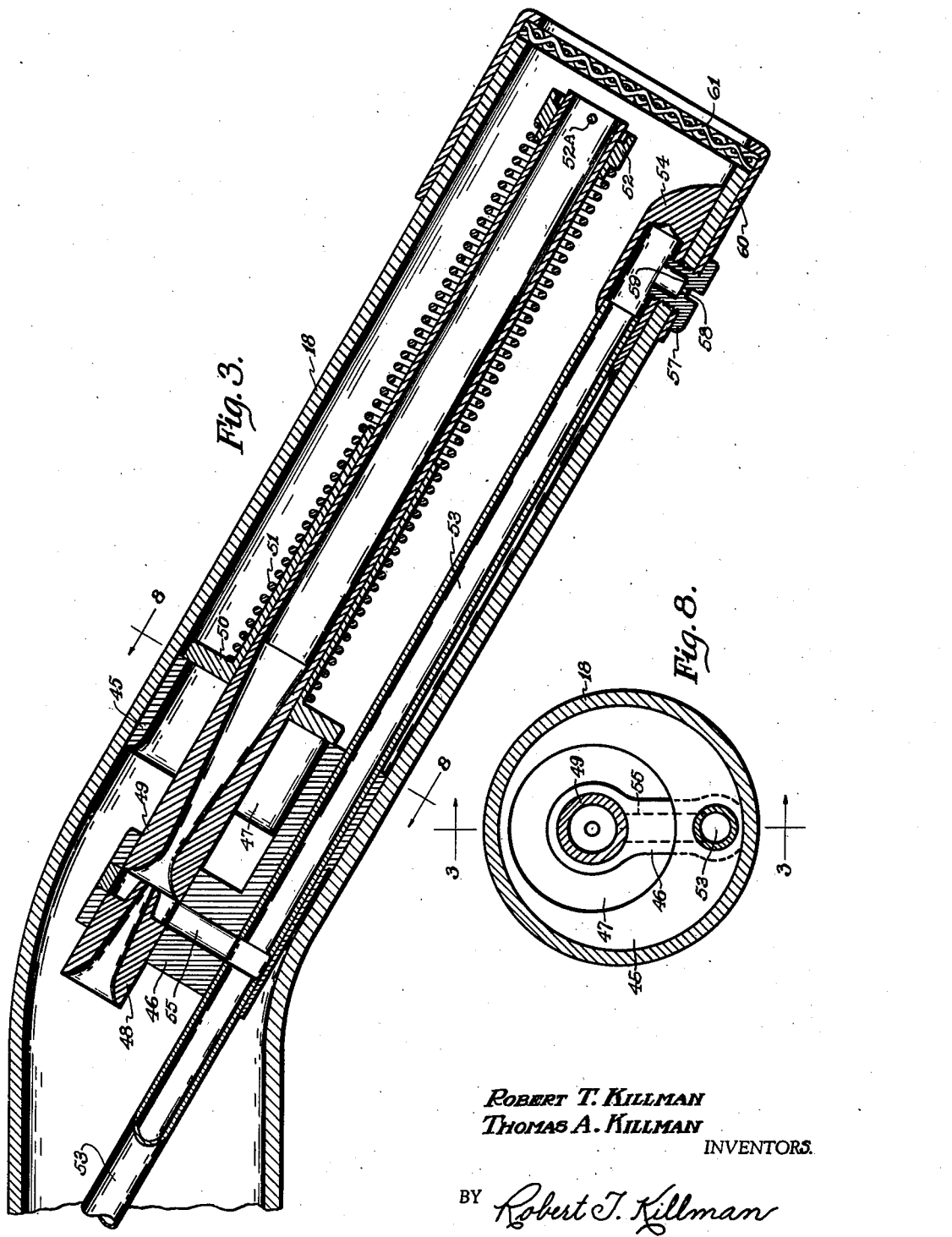

Patented Feb. 3, 1942

2,271,557

UNITED STATES PATENT OFFICE 2,271,557

AUTOMATIC NOZZLE

Robert T. Killman and Thomas A. Killman,
Nashville, Tenn.

Application April 12, 1939, Serial No. 267,400

11 Claims. (Cl. 226—127)

This invention relates in general to liquid dispensing nozzles or spouts such as, for example, gasoline dispensing nozzles, commonly used in automobile service stations attached to the end of a flexible hose line and supplied with gasoline from a meter pump, for dispensing gasoline and conveying it into automobile fuel tanks, and relates more specifically to a nozzle which will automatically cut off the flow of liquid when the tank or container becomes full or when the liquid therein rises to some pre-determined level.

In the operation of automobile service or filling stations, it is often difficult to ascertain when the fuel tank of an automobile being filled with gasoline may be shut off without running the tank over and causing a waste of gasoline, spattering of gasoline over the surfaces of the car adjacent the filler opening, and fire hazard. The liquid level indicating gauges usually installed upon the automobiles are often unreliable, and are generally located upon the dashboard of the automobile out of sight of the service station attendant who is filling the tank. Very often, due to gauge inaccuracies a customer will order a certain specified number of gallons of gasoline when in reality the tank cannot accommodate the addition of the specified amount, thus tending to cause the tank to be run over.

It is an object of the present invention to provide means whereby the flow of gasoline, or other fluid, into a tank or other container, will be automatically shut off before the tank is filled to overflowing, entirely independent of and without any attention from the operator.

The fundamental principle of operation is as follows: Fluid flows through a Venturi tube which has its suction opening connected to a chamber having a movable wall (such as a bellows, a diaphragm, a piston or the like). This chamber is connected by a tube to the position which the upper surface of the liquid in the container is desired to occupy at the moment the flow of liquid is desired to be cut off. Until the liquid surface reaches this predetermined level, this tube supplies the chamber with air in such quantities that the Venturi tube is unable to evacuate said chamber sufficiently to cause movement of said movable wall. When, however, the liquid reaches the predetermined level and covers the end of said tube, it cuts off the air supply to the chamber and due to the great preponderance of the viscosity of the liquid over that of the air, the liquid is unable to travel through the tube and through certain restricted portions thereof, in sufficient quantities to prevent the Venturi tube from evacuating the chamber sufficiently to cause a movement of said movable wall, which movement causes a closure of a valve, thus cutting off the flow of the liquid.

We are aware that a number of devices of this type have been previously made, but all of them which have come to our attention are subject to certain faults and disadvantages.

For example, all of the prior devices of this type caused the entire fluid flow to pass through the Venturi tube. Since the efficiency of Venturi tubes in producing a vacuum depends upon the amount and the speed of the fluid passing therethrough, and these tubes must in all cases, in order to operate at all, be supplied with fluid in sufficient quantities to entirely fill them, it will be evident that if the flow of gasoline through a nozzle of this type is decreased beyond a certain minimum the device will become wholly inoperative. In order to accommodate the full flow of the gasoline the Venturi tube must be made comparatively large, and therefore the minimum flow, above mentioned will be large. Therefore in all devices of this type, the flow controlling valve is intended to be latched or held by the operator in its wide open or full flow position, in order that the Venturi tube may function properly.

Now it is well known to those experienced in the operation of gasoline filling stations that an increasing number of automobiles have fuel tanks and filler tubes and openings which will not receive gasoline at a high rate. This is due to the fact that the inlet tube which extends from the filling neck of the gasoline storage tank of some automobiles is now formed with baffles and with curved portions in order to prevent a siphon tube from being used so as to illegally remove gasoline from the tank. Also artistic considerations, streamlining etc., in the designing of modern cars has necessitated the placing of the filler opening some distance from the fuel tank and connecting the two by means of a relatively long, tortuous, and often very small pipe. It may be mentioned here that this construction makes impractical the use of floats, etc., which must extend a considerable distance into the fluid in order to be operative.

Since, very rarely are fuel tanks vented to any extent, except through the filler opening, difficulty in filling such tanks at any great speed is frequently encountered, due to the entrapped air in the tank, preventing additional gasoline from entering and escaping through the filler tube carrying gasoline outward with it causing overflowing even though the fuel tank is not full of gasoline. In order to fill a tank of this type, the rate of flow of the gasoline must be greatly reduced, and the inability to operate at the necessary reduced flow is one of the faults of the prior devices of this character. Accordingly, it is an object of the present invention to provide an automatic shut-off nozzle which remains fully operative and efficient over the full range of flow from a few drops to the full flow of gasoline as delivered by the meter pump, said range of flow conditions covering any and all rates of flow necessary to properly fill the most recalcitrant tank to be met in practical operation. It is contemplated in this invention that the rate of flow of gasoline be at all times under complete control of the operator, who may, by operating a single grip lever, start or stop the flow, or adjust it to any desired rate or volume at will without interfering with or being interfered with by the automatic action of the device.

Another fault inherent in all prior devices of this character with which we are familiar is due to the fact that they all make use of the restriction due to the small bore of the tube above mentioned (which connects the chamber with the location of the desired fluid level at which cut-off should occur) to distinguish between the difference in viscosity of fluid and air to cause the movable wall to cause the shut-off valve to operate. The fault lies in that if the device is once operated the small tube is left full or nearly full of fluid trapped therein either by capillary action or gravity etc. Upon attempting to use the device a second time, this entrapped fluid, due to its viscosity and the smallness of the bore of the tube, prevents air from reaching the chamber and causes an immediate movement of the movable wall and a shutting off of the fluid flow. This false operation takes place every time an attempt is made to pass fluid through the nozzle until the small tube is cleared of fluid.

Accordingly, an object of the present invention is to provide, in a device of this character, means whereby false operations of the device will be entirely eliminated and a prior operation of the device always leaves it in perfect operable condition for any subsequent operation, without any resetting, clearing of tubes or other attention on the part of the operator.

Another object of the present invention is to provide a device of this character which, due to the absence of floats, weights, etc., will operate in any and all positions in which it is possible to use it to fill a tank, and which, with the exception of automatically shutting off the flow of fluid when the tank becomes full to the predetermined level, is not different in operation in any way from the ordinary dispensing nozzles now in common use.

It is well known that nearly all liquids, gasoline included, when directed into a tank have a tendency to bubble or foam, and that this foam in some cases bubbles out of the filter tube when the tank becomes almost full. If this foam or bubbles is allowed to overflow, almost as much damage is done as if the fluid itself had overflowed. Accordingly it is an object of the present invention to provide in a device of this character means whereby the automatic operation is caused to take place by any foam or bubbles which may be on the liquid surface if such foam or bubbles tend to rise higher than the predetermined level. The operation of the device does not depend upon the inertia or momentum of any current of fluid, as do certain prior devices, and therefore, will automatically shut off the flow when the fluid level rises to such height that there is danger of foam or bubbles overflowing.

Another object of the present invention is to provide in a device of this character means whereby the operator is given a signal, which may be felt, seen and heard, that the automatic operation has taken place and cut off the flow of fluid.

Another object of this invention is to provide a nozzle having means associated therewith for automatically and entirely shutting off the flow of fluid therethrough without appreciably changing the dimensions from those of the conventional nozzle in common use today. Therefore, this improved nozzle may be used for delivering gasoline into tanks having filling necks of conventional construction, and may be hung upon any of the hooks or other supporting devices and may be locked in place thereon by any of the locking means in common use in connection with the dispensing pumps now on the market.

Another fault or disadvantage inherent in prior devices of this general type is the fact that even after the automatic cut-off operation has taken place and the flow is stopped, there remains within the device a considerable quantity of liquid on the down-stream side of the cut-off valve which must be drained into the car fuel tank, and in some cases this additional drainage is enough to over run the tank, particularly if the spout or nozzle were inserted in the filler tube of the fuel tank for only a short distance, and consequently the automatic cut-off operation took place when the fluid level is relatively high in the filler tube.

Accordingly it is a further object of this invention to provide means, in a device of this character, whereby, when the automatic cut-off operation has taken place, all drainage of fluid from the interior of the nozzle is prevented, the flow into the fuel tank stopping instantly with the operation of the automatic cut-off, thus preventing any additional filling of the fuel tank, dripping of gasoline over the car body, waiting for the dripping to cease and other disadvantages.

A further disadvantage or fault common to prior devices of this kind lies in the fact that when the automatic cut-off action does take place the column of liquid in the hose and pipes, which is often an inch or so in diameter and which is flowing oftentimes at the rate of fifteen or twenty gallons per minute, is so suddenly stopped that the inertia or momentum thereof causes a severe and damaging shock to the mechanism and piping of both the cut-off device and the metering and pumping device.

Accordingly it is an object of the present invention to provide means for cushioning the action of the automatic cut-off device so that the flow of liquid will be cut off with less abruptness or shock, so as to cause no damage to the mechanism, while at the same time retaining sufficient shock or jar at both large and small rates of flow to provide an efficient signal to the operator that the automatic cut-off action has taken place.

Another object of the present invention is to provide means whereby the entrainment of air in the stream of liquid emerging from the device into the container being filled is effectively prevented and the stream is caused to be of a well formed coherent nature which is adapted to enter the filler tubes of fuel tanks with a minimum amount of turbulence and disturbance.

Another object of the present invention is to provide a device of this type which does not have protruding or external levers, latches, triggers or the like, which may come into contact with some external objects such as the car body or accessories, the hands or other portions of the operator's body etc. and thereby be prevented from operating properly or be caused to operate falsely thereby. The only projecting lever is the usual manual valve operating grip lever and this is in no way connected with the automatic mechanism.

Another object of the present invention is to provide a device of this character which may be manufactured as a complete nozzle, or certain portions of which may be used as an attachment or accessory to nozzles now in use.

A further object is to provide a device of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

It is to be understood, of course, that this nozzle or spout is not limited for any particular use. It may be used for filling any kind of tank or receptacle with a variety of different fluids. It is described in connection with automobile fuel tanks for the reason that they will be its most general use.

The method of accomplishing the above mentioned objects and advantages will be clearly understood by reference to the following description in connection with the accompanying drawings, in which Figure 1 is a side elevation of the complete attachment of our invention. A conventional nozzle valve is shown in phantom lines with the device of our invention attached thereto.

Figures 2 and 3 are fragmentary longitudinal sections of our device in its preferred embodiment and, taken together, constitute a complete longitudinal section.

Figure 4 is a fragmentary longitudinal section of the same portion of the device as shown in Figure 2 but illustrates certain optional forms of parts thereof.

Figure 5 is an end view taken along the line 5—5 of Figure 4.

Figure 6 is a cross section of the device taken along the line 6—6 of Figure 2.

Figure 7 is a plan view of a portion of the device with the diaphragm and the diaphragm retaining cover removed.

Figure 8 is a cross section of the device taken along the line 8—8 of Figure 3.

Referring now in more detail to the drawings the numeral 10 indicates generally the usual manually operated nozzle valve adapted to be attached to the delivery end of a flexible hose which in turn is attached to a liquid pump, usually a gasoline or other fuel dispensing combination pump and meter as used generally at gasoline filling stations. The nozzle valve 10 essentially comprises a casing 11, a valve contained therein and urged to its closed position by a suitable spring, a projecting valve stem 12 and a hand lever 13 by which the operator may open the valve against the pressure of the liquid and of the spring. Such a nozzle valve usually incorporates some arrangement to prevent chatter and to allow smooth control of the stream. These arrangements usually take the form of multiple valves, dashpot controls, variable leverage, etc. A tubular spout is generally threaded into the delivery end of the nozzle valve for the delivery of liquid to the desired point. Such valves are well known in the art and vary in detail with the individual maker, and the details and construction thereof form no part of this invention.

The automatic shut-off device of this invention is an attachment designed to be threadedly attached to any nozzle valve as above described replacing the tubular spout above referred to and forming with said nozzle valve a structure of approximately the same dimensions as the nozzle valve with its original tubular spout so that the nozzle valve with the automatic shut-off device attached may be hung up on the pump or other dispenser and used in every way exactly as was the nozzle valve with its original tubular spout.

Our automatic shut-off device includes an adaptor sleeve 14 externally threaded and adapted to threadedly engage the nozzle valve casing 11. Internally formed lugs 15 allow a suitable wrench to be used for tightening the sleeve 14 therein. A clamp ring 16 having an internal shoulder for co-acting with an externally formed shoulder on the adaptor sleeve 14 threadedly engages the externally threaded enlarged portion of the casing 17 and draws casing 17 against adaptor sleeve 14 forming a liquid tight joint. This joint arrangement allows of the use of different styles and sizes of adaptor sleeves 14 to fit all nozzle valves now in use and also allows the automatic shut-off attachment to be attached to the nozzle valve in the proper relation thereto.

Permanently attached to the other end of the casing 17, as by soldering, spinning or otherwise, is the tubular spout member 18 which is bent downward at a slight angle to allow convenient delivery of liquid. Formed integrally with the casing 17 is the circular diaphragm chamber 19 which is internally threaded to receive the diaphragm retainer and lid 20 which clamps a diaphragm 21 between the lower surface of its depending peripheral shoulder and a coacting shoulder 22 formed within the diaphragm chamber 19. The diaphragm 21 is made of thin material such as impregnated fabric, thin corrugated metal or the like, and is provided with sufficient slack so as to be capable of appreciable vertical movement within the diaphragm chamber 19 and is provided at its center with the two stiffening washers 23 which clamp the diaphragm between them. The lower of these washers is provided, at the center of its lower surface, with the lug or pusher member 24 the purpose of which will be explained later.

Depending from and integral with the lower surface of the diaphragm chamber is the cylinder 25 which is concentric with the casing 17. One end of cylinder 25 is closed by plug 25A. Also depending from the lower surface of the diaphragm chamber and integral therewith and with cylinder 25 is the small cylindrical member 26, the purpose of which will be explained later. Slidably located in cylinder 25 is the piston member 27 which carries at its outer end the valve member 28 which co-acts with valve seat 29 formed in the interior surface of casing 17 to control the passage through casing 17. The piston 27 is bored out for a portion of its length to receive the retractile spring 30 one end of which is attached to the inner end of the piston 27 and the other end of which is looped over a hook finger 31 formed in the baffle member 32 which is retained in casing 17 by the three radial fingers 33 which are received in the slight enlargement 34 in the end of casing 17. The spring 30 thus urges piston 27 to withdraw from cylinder 25 and also urges valve member 28 against baffle member 32.

A rectangular groove 35 is formed in the lower wall of the diaphragm chamber extending from the center to the side of the chamber farthest from the valve seat 29. This groove is separated from the central opening of cylinder 25 by a relatively thin wall 36. Positioned in groove 35 is the rocker latch member 37 having the fulcrum edges 38 which rest on the floor of groove 35 in such manner that the latch member may rock back and forth thereon. A thrust bearing pin 39 affixed to the center of the latch member 37 adjacent fulcrums 38, fits loosely into a hole 40 formed in wall 36 but is not sufficiently long to reach into the central opening of cylinder 25. A latch pin 41 affixed to one end of the latch member 37 passes through the relatively large aperture 42 into the central opening in cylinder 25 where it co-acts with the end of piston 27 in such manner as to latch piston 27 and prevent it from moving further into cylinder 25. However, if latch member 37 is rocked back upon fulcrums 38 latch pin 41 may be withdrawn from engagement with the end of piston 27 thus unlatching it and allowing further movement into cylinder 25. A spring member 43 formed of wire into an approximate hairpin shape having its ends formed into approximate semi-circles is retained in the circular groove 44 formed in the lower part of the diaphragm chamber and the hairpin portion of said spring member bears upon the upper surface of the latch member 37 and urges it to rock upon fulcrums 38 so that pin 41 enters the cylinder and engages the end of piston 27. The end of piston 27 is slightly dished so as to make the latch pin fit and hold it more securely.

The lug or pusher member 24, previously mentioned, attached to the lower side of diaphragm washer 23 acts to rock the latch member 37 on its fulcrum 38 as the diaphragm moves down and thus unlatches the piston member 27.

Located in the tubular spout member 18 at a point below the bend is the eccentrically apertured abutment 45. A portion of this abutment forms an overhanging arm 46 which is bored concentrically with the eccentric aperture 47 in the abutment 45 and which holds the jet pump comprising the jet memebr 48 and the Venturi tube 49. The Venturi tube 49 extends downward through the aperture 47 and forms a guide rod for the valve 50 which co-acts with the lower face of abutment 45 as a valve seat and is urged thereagainst by spring 51 which is secured to the Venturi tube by sleeve 52 and retaining pin 52A. A suction tube 53 terminating in a coupling member 54 passes upwards through the abutment 45, communicating with the jet pump by means of passage 55 formed in the overhanging arm 46, and extends upward inside the tubular spout member 18 and joins the small cylinder 26 in which it extends upward to the aperture 56 which thus connects it to the diaphragm chamber 19. A screw 57 formed with a relatively small aperture 58 in a thin wall 59 passes through the wall of the tubular spout 18 into the cavity in the coupling member 54. This screw also serves to retain in position over the end of the tubular spout 18 the sleeve member 60 which in turn retains the wire screen 61 over the end of the tubular spout member 18.

The operation of the preferred embodiment of our invention thus far described is as follows: Assume nozzle valve 10 to be connected by means of a suitable flexible hose to an ordinary gasoline dispensing pump supplying gasoline to it at the usual pressure. If now the operator grips the operating lever 13 of the nozzle valve the valve will be opened and fluid will be allowed to pass through the nozzle valve and into the automatic shut-off attachment of our invention which is assumed to be attached to the nozzle valve 10 at the end 11 thereof instead of the usual tubular spout as is generally used with such nozzle valves, as previously described. The fluid thus passes through the adapter sleeve 14, around baffle plate 32 and valve 28, through the opening in valve seat 29, through the open space inside casing 17 into tubular spout 18. The fluid is now offered two alternate paths. It may force valve 50 from its seat against the under side of the abutment 45, compressing valve spring 51. Or it may enter and pass through the small nozzle jet 48, thence enter the upper end of Venturi tube 49 and pass on through. In following either path it eventually reaches the lowermost end of spout 18 and passes through screen 61 and emerges as a free stream which is directed into the fuel tank or other container which it is desired to fill.

The valve 50 and its valve spring 51 act as a pressure control and maintain the fluid pressure in the device above the abutment 45 substantially constant regardless of how little or how much the manually operated nozzle valve is opened by the operator, provided said manually operated nozzle vlave is opened sufficiently to supply the nozzle jet 48. Any excess flow beyond the capactiy of the jet 48, which is of relatively small size, is passed by valve 50 which adjusts itself to accommodate such flow, at the same time maintaining a substantially constant head or pressure upon the jet 48, regardless of the flow.

The fluid, in passing from jet 48 into and through Venturi tube 49, by operation of well known laws of hydraulics, tends to evacuate the contents of passage 55 and tube 53. As long, however, as the screw 57 is not submerged in liquid, air may enter the small orifice 58 and pass through the larger passage in screw 57 and replace the material evacuated from tube 53 and passage 55 at a rate sufficient to prevent any appreciable lowering of the pressure therein. If it be assumed that the end of the tubular spout 18 be inserted into the vessel being filled so that, when the liquid therein reaches the desired level, the small orifice 58 will be submerged then, at that time, air is prevented by the liquid from entering orifice 58 and the liquid, by reason of its greater body or viscosity as compared to air, cannot enter the small orifice 58 at a sufficient rate to prevent the jet pump from lowering the pressure in tube 53 and passage 55. Since tube 53 is connected at its upper end through opening 56 with the portion of the diaphragm chamber beneath the diaphragm, it will be seen that the pressure at this point will also be lowered and that the atmospheric pressure acting upon the upper surface of the diaphragm 21 will force the diaphragm to bend downward. The boss 24 on the under side of the diaphragm washer 23 will press against the end of the rocker member 37 and will cause it to rock upon fulcrums 38 and thus withdraw latch pin 41 from engagement with the end of piston 27. Since the space within cylinder 25 between the inner end of piston 27 and plug 25A communicates by means of aperture 42 with the diaphragm chamber below the diaphragm the pressure in this space will also be lower than atmospheric. The pressure upon the upper end of this piston 27 and in the cavity within the piston is above atmospheric pressure by the amount necessary to lift valve 50 from its seat against spring 51 as explained above. The algebraic sum of these two pressures is therefore acting to urge piston 27 to move farther into cylinder 25 and to bring valve 28 against its seat 29 and this action takes place as soon as the restriction imposed by pin 41 is removed as above described, and the flow of liquid is thus cut off. This downward or closing movement of piston 27 and valve 28 stretches spring 30 which is urging them in the reverse or re-set direction, but the pressure of the liquid against the face of valve 28 will hold it against its seat 29 as long as the manual nozzle valve is held open. As soon as the manual valve is closed the slight leakage of valve 28 allows the pressure above it to fall whereupon spring 30 returns it and piston 27 to their original position, while spring 43 rocks the rocker member 37 on its fulcrums 38 and inserts pin 41 into its latching position and returns the diaphragm to its original position and the device is then ready for another operation.

The above constitutes in the main the operation of the device. However several details must be further explained.

If the valve 28 were allowed to close upon its seat 29 without hindrance the flow of liquid, amounting in some cases to fifteen or twenty gallons per minute would be shut off so suddenly that the parts of the device as well as the pump and meter would be subjected to considerable shock and strain. In order to prevent this shock we have provided the following construction. As the piston 27 moves downward into cylinder 25 whatever liquid is contained between the end of piston 27 and plug 25A must escape through aperture 42. Also this aperture is being cut off by the end of piston 27 as it passes across it. The parts are so proportioned that the end of piston 27 reaches the downward edge of aperture 42 just before valve 28 reaches its seat 29. Therefore liquid entrapped within the space between the end of piston 27 and plug 25A must escape therefrom through whatever leaks are present and as these are relatively small the downward progress of the piston 27 and valve 28 from this point to the closed position are thus slowed down somewhat and the sudden shock of an abrupt cut-off is partially eliminated. It is to be understood that some shock at this time is desirable as a signal to the operator that the cut-off has taken place and therefore the cushioning effect is not made sufficient to prevent all shock.

In our preferred embodiment we depend upon the natural leakage of liquid around the piston 27 which is made a slightly loose fit in cylinder 25 to supply the space between the end of piston 27 and plug 25A with liquid. During all of the time that liquid is being delivered to the container being filled the pressure around the upper end of cylinder 25 forces a small amount of leakage liquid between piston 27 and the cylinder walls into the space between the end of piston 27 and plug 25A. When this space becomes full the liquid rises through the aperture 42 and fills the diaphragm chamber beneath the diaphragm 21 until its level reaches the hole 56 which is in the upper side of the diaphragm chamber whence it passes through tube 53 downward and any excess is carried off by the jet pump. This construction keeps the space between the end of piston 27 and plug 25A and the diaphragm chamber at all times full of liquid, the diaphragm chamber acting as a reservoir or trap to replenish the space between the end of piston 27 and plug 25A with liquid as the piston moves away from plug 25A in its resetting movement. The fact that the diaphragm chamber is maintained substantially full of liquid quickens the cut-off operation of the device since, as liquid is non-expansible, an operative degree of vacuum may be more quickly produced in the chamber than if it were filled with air which is expansible.

In this connection we have provided an optional arrangement for keeping the diaphragm chamber and the space between the end of piston 27 and plug 25A supplied with liquid and an optional arrangement of the cushioning structure for valve 28. These optional arrangements are shown in Figure 4 wherein valve 28 is shown in its closed position and latch member 37 in its unlatched position. In the optional construction as shown in Figure 4 we have provided in the external surface of piston 27 a circumferential groove or slot 63 which communicates with the internal space within piston 27 by a suitable opening 64. This groove 63 is so positioned upon piston 27 that it aligns with a passage 62 formed in the floor of the diaphragm chamber when the valve 28 is in its closed position. This allows liquid to pass from the cavity within piston 27, where it is under pressure, into the diaphragm chamber as long as the manually operated nozzle valve is held opened and, upon the closing of said manually operated nozzle valve, allows the liquid pressure above valve 28 to fall to atmospheric pressure very quickly and thus allow valve 28 to be reset by spring 30 without waiting for the pressure to be reduced by leakage through valve 28 as was described in connection with the preferred embodiment.

We have also provided means in the optional arrangement as shown in Figure 4 for providing a more easily recognizable signal to the operator that the cut-off operation has taken place when the flow of liquid through the device is small while at the same time cushioning the severe shock of the cut-off at large rates of flow. In order to accomplish this effect we provide a circumferential groove or slot 65 in the piston at a point near its lower end and provide ducts or passages 66 in this piston body which communicate with the space between the end of the piston 27 and the plug 25A. The groove 65 and the aperture 42 are so formed and positioned that, in the downward movement of piston 27, just as the end of piston 27 closes off aperture 42 groove 65 comes into registry therewith, thus releasing the fluid entrapped in the dashpot cylinder.

This action results in the downward movement of the piston being momentarily checked at a point just before the valve 28 reaches its seat 29 and then being fully released so that the valve 28 is free to shut off the remaining small flow quickly or suddenly. Thus a large flow is reduced, by a cushioned movement of the valve 28 to a small flow and this small flow is immediately shut off with a quick movement producing a small shock which acts as a signal to the operator that the device has operated to shut off the flow. Thus the destructive shock of cutting off the large stream is eliminated while at the same time sufficient shock is preserved to act as a signal to the operator when the device is used under either small or large flow conditions.

It will be noticed that the flow of liquid as it enters the attachment from the nozzle valve is prevented from striking the back side of valve 28 by the baffle plate 32. This construction is used for the purpose of making the device equally operable at either small or large rates of flow. If the momentum of the full stream were allowed to strike the back side of valve 28 this momentum pressure would be added to the static pressure upon piston 27 and the movement of the latch pin 42 would require more effort than it would if the flow was small and the momentum pressure therefore small. The baffle is used to eliminate the effect of the pressure due to the stream's momentum so that the effort required to unlatch the valve is constant regardless of the flow.

The wire screen 61 is for the purpose of preventing a turbulent stream from emerging from the tubular spout 18 and to prevent the entraining of air into the stream, thus producing a solid coherent stream which is not inclined to produce foam and cause blow back of liquid in the container being filled. This screen may also be used to prevent draining of the liquid contained in the tubular spout 18 after the liquid flow has been shut off, either manually or automatically.

It will be noticed that the small orifice 58 in screw 57 is formed in a relatively thin wall section 59. This is for the purpose of preventing false operation of the device caused by liquid remaining in these passages. All passages except the small orifice 58 are made large enough to allow liquid to pass through them at a sufficient rate to prevent the jet pump from producing an operative degree of vacuum while orifice 58 is made of such size that air may but liquid may not pass therethrough at sufficient rate to prevent the formation of an operative degree of vacuum. Since the length of orifice 58 is very small any residual liquid remaining in it from a previous operation is removed therefrom into the larger passages so quickly that the jet pump does not have sufficient time to produce an operative degree of vacuum before such obstructing liquid is removed and thus false operation of the device is prevented.

Having thus described our invention in a specific embodiment, we are aware that numerous and extensive changes may be made from the embodiment herein illustrated and described, without departing from the spirit of our invention, and we therefore claim our invention as set forth in the claims accompanying this specification and forming a part thereof.

We claim:

1. In a nozzle a normally open valve, vacuum operated means urging said valve to a closed position, means for latching said valve in its open position and means controlled by the level of liquid in a container being filled for unlatching said valve.

2. In a nozzle a normally open valve, vacuum operated means urging said valve to a closed position, means for latching said valve in its open position, means controlled by the level of liquid in a container being filled for unlatching said valve, and means for retarding the movement of said valve to its closed position after being unlatched.

3. In a nozzle a normally open valve, vacuum operated means urging said valve to a closed position, means for latching said valve in its open position, means controlled by the level of liquid in a container being filled for unlatching said valve, means for retarding the movement of said valve to its closed position after being unlatched, said means comprising a dashpot having means for admitting liquid to said dashpot.

4. In a nozzle a normally open valve, vacuum operated means urging said valve to a closed position, means for latching said valve in its open position, means controlled by the level of liquid in a container being filled for unlatching said valve, and means for retarding a portion of the movement of said valve to its closed position after being unlatched.

5. In a nozzle a normally open valve, vacuum operated means urging said valve to a closed position, means for latching said valve in its open position, means controlled by the level of liquid in a container being filled for unlatching said valve, means for retarding a portion of the movement of said valve to its closed position after being unlatched the retarding means having means for releasing its retarding effect after the movement of the valve has been retarded.

6. In a nozzle, a casing, a normally open valve in said casing, pressure and vacuum operated means urging said valve to a closed position, means for latching said valve in an open position, and means controlled by the level of liquid in a container being filled for unlatching said valve.

7. In a nozzle, a casing providing a pressure chamber and a discharge chamber, said pressure chamber having an outlet passage, valve means operable to close said passage, pressure and vacuum actuated means urging said valve to close said passage, means for latching said valve in an open position, vacuum operated means for unlatching said valve, spring loaded valve means for maintaining a constant pressure in said pressure chamber, and a jet pump operated from said pressure and operatively connected to said unlatching means.

8. In an automatic nozzle for filling containers a casing for attachment to a nozzle valve, a cylinder within said casing having a closed end, a valve seat within said casing, a piston slidably carried within said cylinder, a valve member carried by said piston and adapted to coact with said valve seat, a diaphragm chamber carried by said casing and communicating with said cylinder, a flexible diaphragm carried by said chamber, latching means operable to prevent motion of said piston into said cylinder and operable by said diaphragm to allow such motion, means for causing liquid pressure to exist within said casing in such manner as to urge said piston to move into said cylinder, means controlled by the level of fluid in a container being filled for creating a vacuum in said diaphragm chamber and within said cylinder.

9. In an automatic nozzle for filling containers, a casing for attachment to a nozzle valve, a cylinder within said casing having a closed end, a valve seat within said casing, a piston slidably carried within said cylinder, a valve member carried by said piston and adapted to coact with said valve seat, a diaphragm chamber carried by said casing and communicating with said cylinder, a flexible diaphragm carried by said chamber, latching means operable to prevent motion of said piston into said cylinder and operable by said diaphragm to allow such motion, means for causing liquid pressure to exist within said casing in such manner as to urge said piston to move into said cylinder, means controlled by the level of fluid in a container being filled for creating a vacuum in said diaphragm chamber and within said cylinder, the end of said piston being arranged to cut off the communication between said cylinder and diaphragm chamber as it moves into said cylinder so as to entrap liquid in said cylinder and retard further movement of said piston into said chamber.

10. In an automatic nozzle for filling containers, a casing for attachment to a nozzle valve, a cylinder within said casing having a closed end, a valve seat within said casing, a piston slidably carried within said cylinder, a valve member carried by said piston and adapted to coact with said valve seat, a diaphragm chamber carried by said casing and communicating with said cylinder, a flexible diaphragm carried by said chamber, latching means operable to prevent motion of said piston into said cylinder and operable by said diaphragm to allow such motion, means for causing liquid pressure to exist within said casing in such manner as to urge said piston to move into said cylinder, means controlled by the level of fluid in a container being filled for creating a vacuum in said diaphragm chamber and within said cylinder, the end of said piston being arranged to cut off the communication between said cylinder and diaphragm chamber as it moves into said cylinder so as to entrap liquid in said cylinder and retard further movement of said piston into said chamber, and the piston and cylinder having cooperating means for releasing said entrapped fluid after the movement of said piston has been retarded.

11. In an automatic nozzle for filling containers, a casing for attachment to a nozzle valve, a cylinder within said casing having a closed end, a valve seat within said casing, a piston slidably carried within said cylinder, a valve member carried by said piston and adapted to coact with said valve seat, a diaphragm chamber carried by said casing and communicating with said cylinder, a flexible diaphragm carried by said chamber, latching means operable to prevent motion of said piston into said cylinder and operable by said diaphragm to allow such motion, means for causing liquid pressure to exist within said casing in such manner as to urge said piston to move into said cylinder, means controlled by the level of fluid in a container being filled for creating a vacuum in said diaphragm chamber and within said cylinder, the end of said piston being arranged to cut off the communication between said cylinder and diaphragm chamber as it moves into said cylinder so as to entrap liquid in said cylinder and retard further movement of said piston into said chamber, the cylinder and piston having means for releasing said entrapped fluid after the movement of said piston has been retarded, and having means for introducing fluid from the interior of said casing into said diaphragm chamber during a portion of the movement of said piston.

ROBERT T. KILLMAN.
THOMAS A. KILLMAN.